United States Patent [19]

Kawaguchi, deceased et al.

[11] Patent Number: 4,511,833
[45] Date of Patent: Apr. 16, 1985

[54] STEPPING MOTOR DRIVING CIRCUIT

[75] Inventors: Yukio Kawaguchi, deceased, late of Shizuoka, Japan; Nobuichi Kawaguchi, legal representative, Onoda, Japan

[73] Assignee: Tokyo Electric Co., Ltd., Tokyo, Japan

[21] Appl. No.: 531,655

[22] Filed: Sep. 13, 1983

[30] Foreign Application Priority Data

Nov. 10, 1982 [JP] Japan .................... 57-197068

[51] Int. Cl.$^3$ ............................ H02K 29/04
[52] U.S. Cl. ............................ 318/696; 318/685
[58] Field of Search .................. 318/696, 685; 340/825.47; 455/31

[56] References Cited

U.S. PATENT DOCUMENTS 4,358,725 11/1982 Brendemuehl ............... 318/696
4,369,443 1/1983 Giallanza et al. ............ 340/825.47

FOREIGN PATENT DOCUMENTS 2,944,355 6/1980 Fed. Rep. of Germany.
2,330,853 1/1974 Fed. Rep. of Germany.
2,022,345 5/1979 United Kingdom.

OTHER REFERENCES

IBM Technical Disclosure Bulletin, Vol. 22, No. 12, May 1980, pp. 5243–5250, Bateson et al.

Primary Examiner—William M. Shoop
Assistant Examiner—Saul M. Bergmann
Attorney, Agent, or Firm—Frishauf, Holtz, Goodman & Woodward

[57] ABSTRACT

A motor driving circuit includes first and second transistors whose collectors are respectively connected to each one end of a pair of motor coils and whose emitters are grounded through a first resistor, and which are alternately turned on, a switching circuit connected between the other ends of the pair of motor coils and a power supply terminal, and a comparator which receives a reference voltage and a voltage drop across the first resistor respectively at its first and second input terminals and controls the conduction state of the switching circuit in accordance with the result of comparison between two input voltages. A second resistor and a capacitor are connected in series between the output terminal and the second input terminal of the comparator.

5 Claims, 10 Drawing Figures

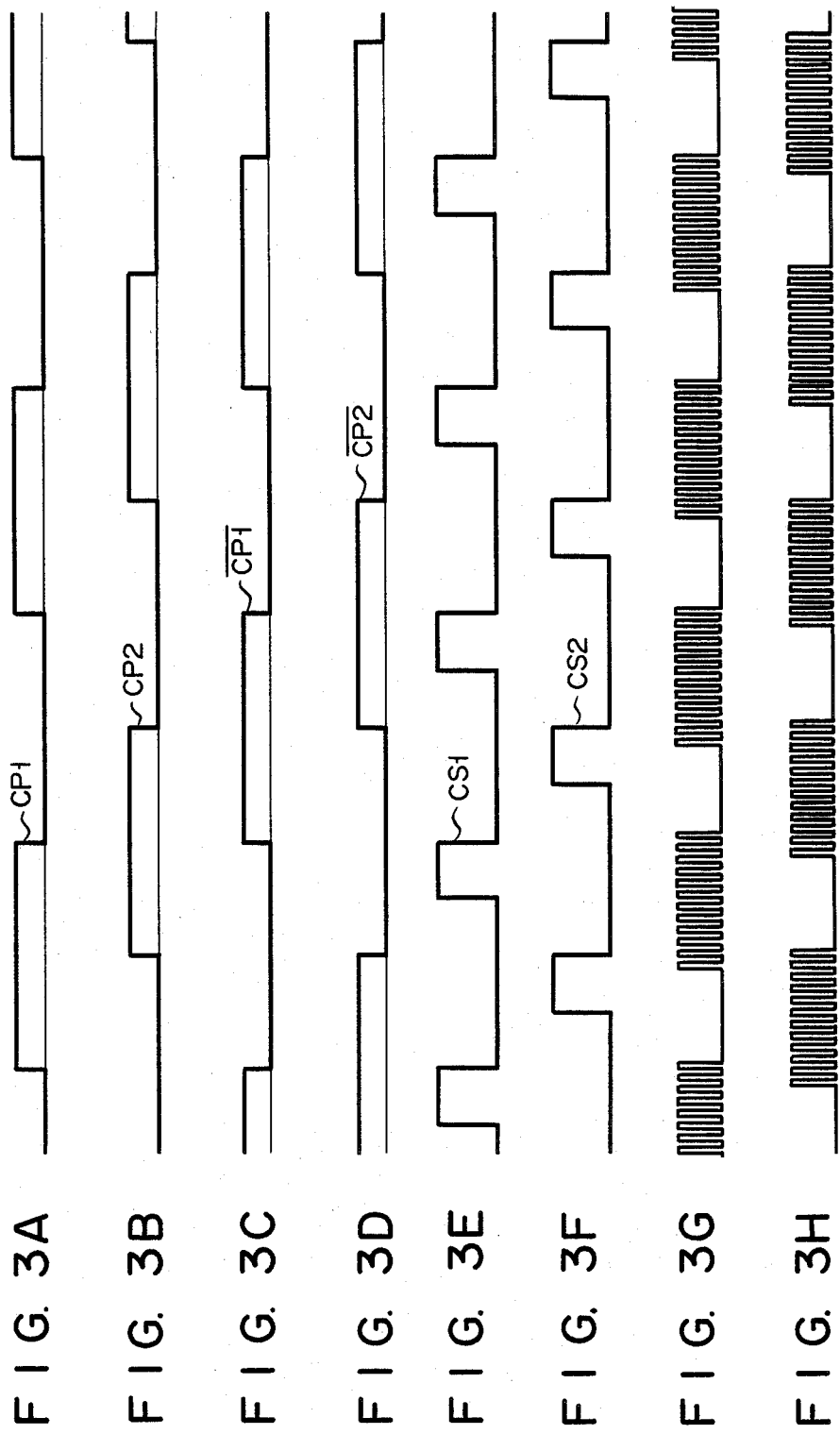

STEPPING MOTOR DRIVING CIRCUIT

BACKGROUND OF THE INVENTION

This invention relates to a stepping motor driving circuit to drive a stepping motor.

Conventionally, various types of stepping motor driving circuits have been developed to stably and securely drive a stepping motor. FIG. 1 shows an example of conventional stepping motor driving circuits. In the diagram, coils L1 and L2 are motor coils for the stepping motor and are energized by exciting currents having a mutual phase difference of 180°. These motor coils L1 and L2 are each connected at one end through a choke coil LX and a transistor switching circuit TSC1 to a positive power supply terminal VC, and connected at the other end through a corresponding one of npn transistors TR1 and TR2 to one end of a resistor R1 which is grounded at the other end. A series circuit of a diode D1 and a resistor R2 is connected in parallel to the motor coil L1, and a series circuit of a diode D2 and a resistor R3 is connected in parallel to the motor coil L2.

The transistor switching circuit TSC1 includes a pnp transistor TR3 whose collector and emitter are respectively connected to the choke coil LX and the power supply terminal VC; and npn transistor TR4 whose collector is connected through resistors R4 and R5 to the power supply terminal VC and whose emitter is grounded; and a diode D3 whose cathode is connected to the collector of the transistor TR3 and whose anode is grounded. The connection point between the resistors R4 and R5 is connected to the base of the transistor TR3. The base of the transistor TR4 of the transistor switching circuit TSC1 is connected to a voltage comparing circuit VCP1 for comparing a voltage across the resistor R1 with a reference voltage to be determined in accordance with a control signal CS1 from a drive signal generator DSG. This voltage comparing circuit VCP1 includes a pnp transistor TR5 whose emitter is connected to a positive power supply terminal VE and through a resistor R6 to the base of the transistor TR5 and whose collector is connected through resistors R8 to R10 to the power supply terminal VE and through a resistor R7 to the emitter of the transistor TR5; a comparator CMP1 whose inverting input terminal and non-inverting input terminal are grounded respectively through a capacitor C1 and a resistor R11 and whose output terminal is connected through a resistor R12 to the base of the transistor TR4; and a diode D4 connected between the base of the transistor TR4 and the ground. The output terminal of the comparator CMP1 is also connected to a connection point between the resistors R9 and R10, and the non-inverting input terminal is connected to the connection point between the resistors R8 and R9. A voltage VEE lower than a voltage VCC that will be applied to the power supply terminal VC is applied to the power supply terminal VE.

A drive signal CP1 from the drive signal generator DSG is supplied through an inverter IV1 and a resistor R13 to the base of the transistor TR1, and a drive signal $\overline{CP1}$, which is in inversion relation to this drive signal CP1, is supplied through an inverter IV2 and a resistor R14 to the base of the transistor TR2.

This motor driving circuit further includes a motor coil energizing circuit MCEC1 for supplying an exciting current to another pair of motor coils L3 and L4 indicated by the broken lines in FIG. 1 in response to drive signals $\overline{CP2}$ a control signal CS2 from the drive signal generator DSG. This motor coil energizing circuit MCEC1 is constituted and operates in the same manner as the above-described motor coil energizing circuit to pass the exciting current through the motor coils L1 and L2.

Next, the operation of the motor driving circuit shown in FIG. 1 will be described.

When the control signal CS1 from the drive signal generator DSG is at a low level, the transistor TR5 is turned on. In this case, a voltage V11 at the noninverting input terminal of the comparator CMP1 is represented by the following equation.

$$V11 = \frac{R9 \cdot R11 \cdot VEE + R8 \cdot R11 \cdot VCH}{R8 \cdot R9 + R9 \cdot R11 + R11 \cdot R8} \quad (1)$$

Wherein, VCH is a high level output voltage from the comparator CMP1.

For example, assuming that VCH=15 V, R8=2.4 kΩ, R9=33 kΩ, R11=1kΩ, and VEE=5 V, then V11 is almost equal to 1.75 V.

The transistors TR4 and TR3 are turned on in response to a high level output signal which is generated from the comparator CMP1 by the non-inverting input voltage V11. Thus, the exciting current flows through the motor coil L1 or L2 connected to one of the transistors TR1 and TR2 which is turned on by the drive signal CP1 or $\overline{CP1}$, allowing the stepping motor to be driven by one step. For example, now assuming that the drive signal CP1 is at a low level and the transistor TR1 is made conductive, and a current IF1 flows through the transistor TR3, choke coil LX, motor coil L1, transistor TR1, and resistor R1. When this current IF1 is smaller than V11/R1, an output signal of the comparator CMP1 is held at a high level. When the current IF1 is larger than V11/R1, the output signal of the comparator CMP1 reaches a low level VCL, causing the transistors TR4 and TR3 to be turned off. In this case, the input voltage V12 to the non-inverting input terminal of this comparator CMP1 is represented by the following equation.

$$V12 = \frac{R9 \cdot R11 \cdot VEE + R8 \cdot R11 \cdot VCL}{R8 \cdot R9 + R9 \cdot R11 + R11 \cdot R8} \quad (2)$$

Assuming VCL=−15 V, then V12=1.13 V. Thus, although a voltage supply from the power supply terminal VC is cut off, the current IF1 continuously flows through the transistor TR1 and resistor R1 due to the current energy accumulated in the choke coil LX and motor coil L1. When this current IF1 becomes smaller than V12/R1, the output signal of the comparator CMP1 again reaches a high level to turn on the transistors TR4 and TR3, so that the exciting current flows again through the motor coil L1. Therefore, the stepping motor is securely held in the present location. In this way, while the control signal CS1 is at the low level, the output signal which reaches a high level periodically is generated from the comparator CMP1, allowing the exciting current to flow periodically through the motor coil L1.

When the control signal CS1 from the drive signal generator DSG1 is at a high level, the transistor TR5 is off. In this case, an input voltage V13 at the noninverting input terminal of the comparator CMP1 is represented by the following equation.

$$V13 = \frac{(R7 + R8) \cdot R11 \cdot VCC + R9 \cdot R11 \cdot VEE}{(R7 + R8) \cdot R9 + R9 \cdot R11 + R11 \cdot (R7 + R8)} \quad (3)$$

For example, assuming that R7=4.7 kΩ, then, the input voltage V13 is almost equal to 0.99 V.

The transistors TR4 and TR3 are turned on by the high level output signal VCH which is generated from the comparator CMP1 by the non-inverting input voltage V13. Now, assuming that the drive signal CP1 is at a low level and the transistor TR1 is conductive, the current IF1 flows through the transistor TR3, choke coil LX, motor coil L1, transistor TR1, and resistor R1. When this current IF1 gradually increases and becomes larger than V13/R1, the low level output signal VCL is generated from the comparator CMP1. In this case, an input voltage V14 at the non-inverting input terminal of this comparator CMP1 is represented by the following equation.

$$V14 = \frac{R9 \cdot R11 \cdot VEE + (R7 + R8) \cdot R11 \cdot VCL}{(R7 + R8) \cdot R9 + R9 \cdot R11 + R11 \cdot (R7 + R8)} = 0.213 \quad (4)$$

Thereafter, when the current IF1 gradually decreases and becomes smaller than V14/R1, the high level output signal VCH is generated from the comparator CMP1. In this way, while the control signal CS1 is at a high level, the output signal which periodically reaches a high level is generated from the comparator CMP1, allowing the current to periodically flow through the motor coil L1, thereby securely holding the stepping motor in the current location.

In the driving circuit shown in FIG. 1, the driving of the stepping motor is controlled by the periodic generation of high level voltage from the comparator CMP1 utilizing the hysteresis characteristics of the voltage comparing circuit VCP1 and the current energy to be accumulated in the choke coil LX and motor coil L1 or L2. However, the current energy accumulated in these motor coils is not constant due to mutual interference between the motor coils L1 and L2 or the like and it is difficult to supply the exciting current at stable periods.

SUMMARY OF THE INVENTION

It is an object of the present invention to provide a stepping motor driving circuit which can stably drive a stepping motor by supplying exciting current to each motor coil at stable periods.

This object is accomplished by a motor driving circuit which includes at least one coil current control circuit having a switching circuit connected to a pair of motor coils, a first resistor connected at one end to a reference power supply terminal, and first and second switches respectively connected in series with the pair of motor coils between the switching circuit and the other end of the first resistor; an energizing circuit for alternately energizing these first and second switches; a reference voltage generator; a comparator whose first input terminal is connected to the output terminal of this reference voltage generator and whose second input terminal is connected to the other end of the first resistor, and which compares the voltages applied to these first and second input terminals, thereby controlling the conduction state of the switching circuit in accordance with this comparison result; and a series circuit of a second resistor and a capacitor connected between the output terminal and the second input terminal of this comparator. When the comparator generates an output signal to turn off the switching circuit, a feedback current flows through the series circuit of the second resistor and capacitor so that the output state of this comparator can be held over a time interval corresponding to the time constant of the second resistor and capacitor.

BRIEF DESCRIPTION OF THE DRAWINGS

FIGS. 3A to 3H are signal waveform diagrams illustrating the operation of the motor driving circuit shown in FIG. 2.

DETAILED DESCRIPTION OF THE PREFERRED EMBODIMENT

Figure 1:
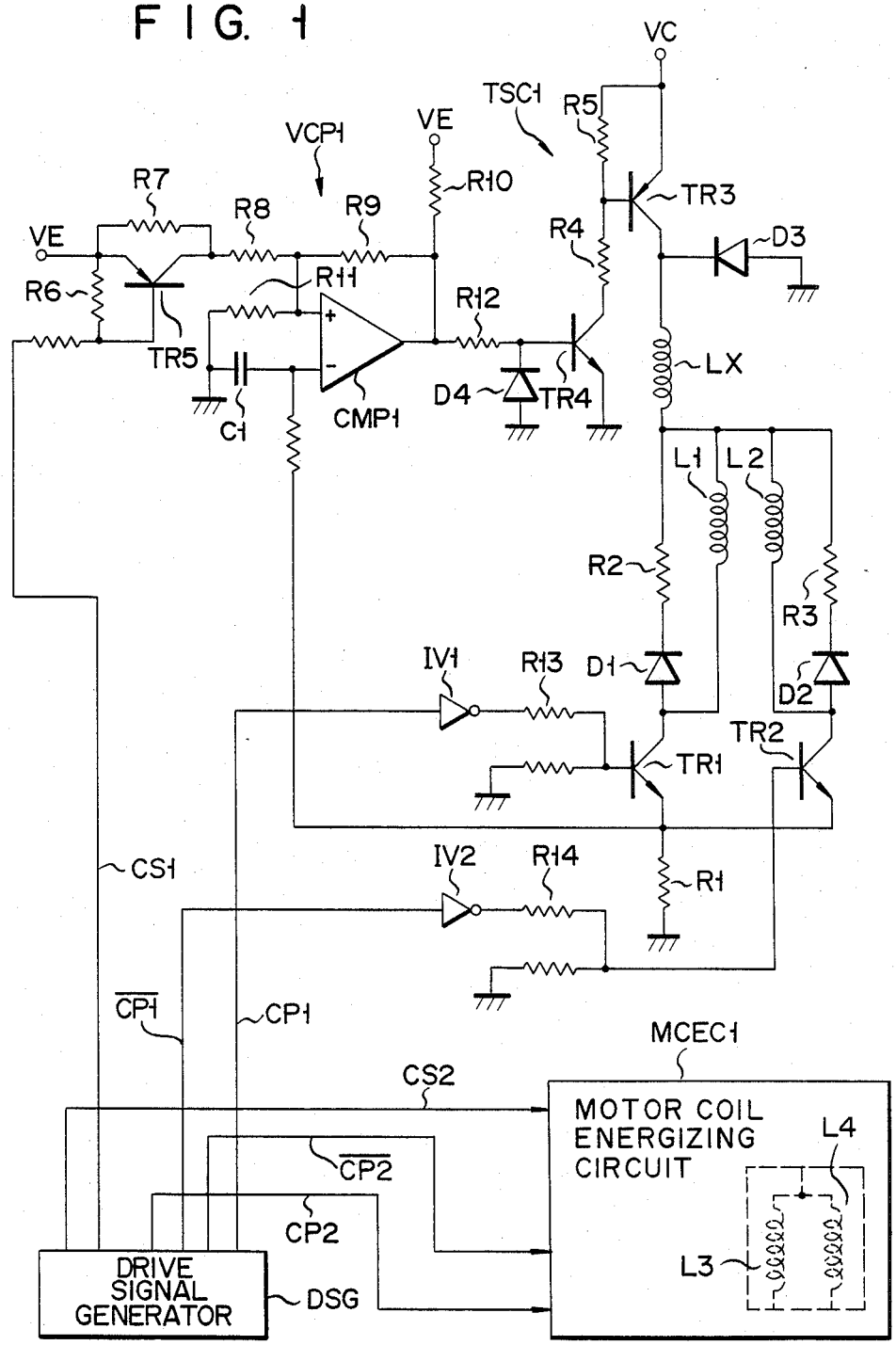
FIG. 1 is a circuit diagram of a conventional motor driving circuit.
Figure 2:
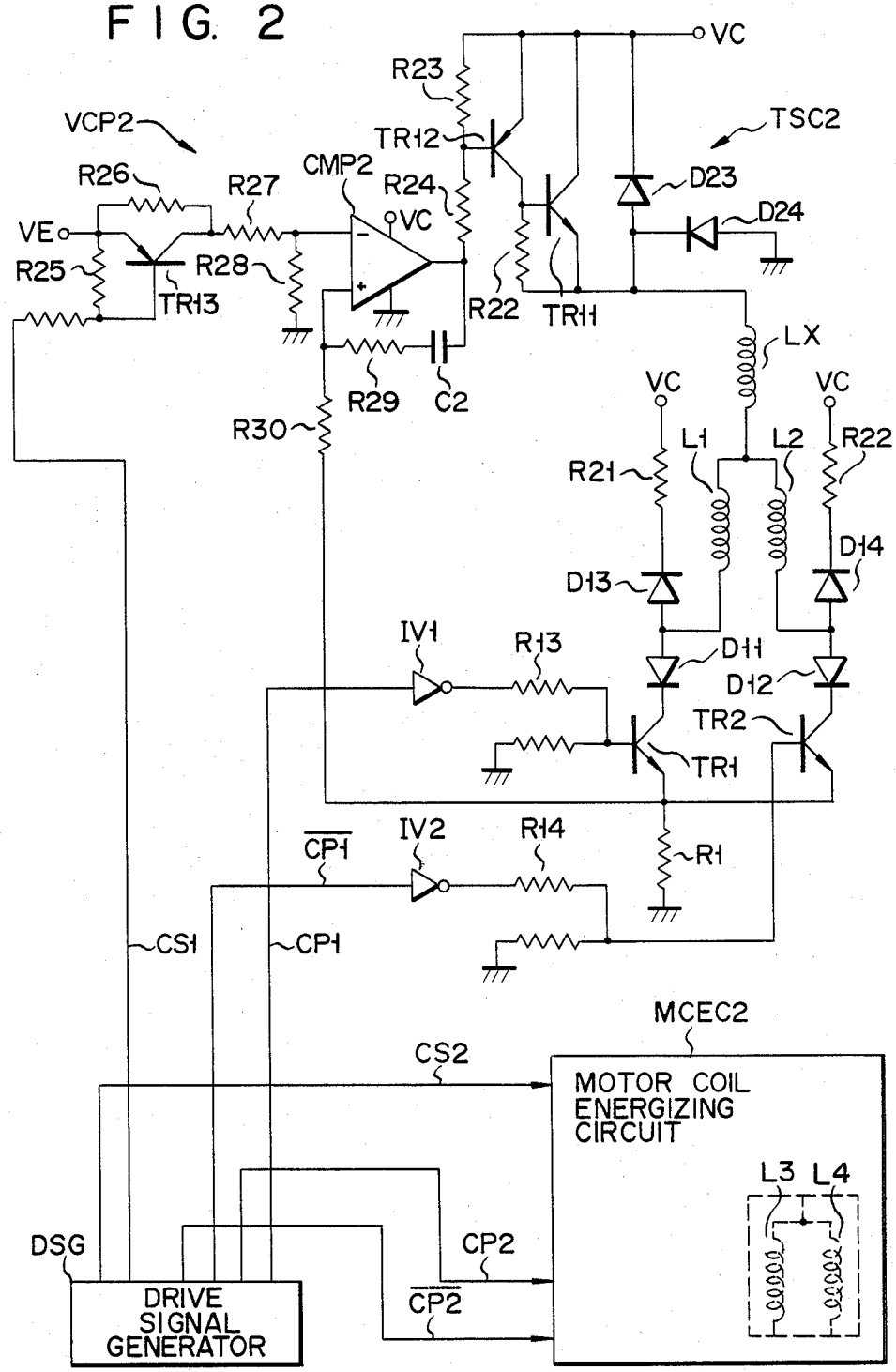
FIG. 2 is a circuit diagram of a motor driving circuit according to an embodiment of the present invention.

FIG. 2 shows a stepping motor driving circuit according to an embodiment of the present invention. This driving circuit includes a choke coil LX, one end thereof being connected through a transistor switching circuit TSC2 to a positive power supply terminal VC and the other end being commonly connected to one end of motor coils L1 and L2; and npn transistors TR1 and TR2 whose collectors are respectively connected through diodes D11 and D12 to the other ends of the motor coils L1 and L2 and whose emitters are commonly grounded through a resistor R1. The other end of the motor coil L1 is also connected through a diode D13 and a resistor R21 to the positive power supply terminal VC. The other end of the motor coil L2 is also connected through a diode D14 and a resistor R22 to the positive power supply terminal VC. A drive signal CP1 from a drive signal generator DSG is supplied through an inverter IV1 and a resistor R13 to the base of the transistor TR1. A drive signal $\overline{CP1}$ is supplied through an inverter IV2 and a resistor R14 to the base of the transistor TR2.

The conduction state of the transistor switching circuit TSC2 is controlled by an output signal from a voltage comparing circuit VCP2 which compares a voltage across the resistor R1 with a reference voltage to be determined in accordance with the voltage level of the control signal CS1 from the drive signal generator DSG.

The transistor switching circuit TSC2 includes diodes D23 and D24 connected reversely in series between the power supply terminal VC and the ground; an npn transistor TR11 whose collector is connected to the power supply terminal VC and whose emitter is connected to one end of the choke coil LX; and a pnp transistor TR12 whose emitter is connected to the power supply terminal VC and whose collector is connected to the base of the transistor TR11. The base of the transistor TR11 is also connected through the resistor R22 to its own emitter. The base of the transistor TR12 is connected through a resistor R23 to its own emitter and through a resistor R24 to the voltage comparing circuit VCP2. The connection point between the diodes and D23 and D24 is connected to one end of the choke coil LX.

The voltage comparing circuit VCP2 includes a pnp transistor TR13 whose emitter is connected to a power supply terminal VE and through resistors R25 and R26 to itw own base and collector, respectively; and a comparator CMP2 whose inverting input terminal is connected through a resistor R27 to the collector of the transistor TR13 and is also grounded through a resistor R28. The comparator CMP2 also has a non-inverting input terminal connected to a resistor R30. The output terminal of this comparator CMP2 is connected to the resistor R24 and through a capacitor C2 and a resistor R29 to its non-inverting input terminal.

The motor driving circuit shown in FIG. 2 further includes a motor coil energizing circuit MCEC2 which supplies exciting currents to another pair of motor coils L3 and L4 indicated by the broken lines in FIG. 2 in response to drive signals CP2 and $\overline{CP2}$ and a control signal CS2 from the drive signal generator DSG. This motor coil energizing circuit MCEC2 is constituted and operates in the same manner as the motor coil energizing circuit which supplys the exciting currents to the motor coils L1 and L2 as shown in FIG. 2.

In the motor driving circuit shown in FIG. 2, the switching circuit TSC2, transistors TR1 and TR2, and resistor R1 cooperatively constitute a coil current control circuit to control the currents flowing through the motor coils L1 and L2.

The operation of the motor driving circuit shown in FIG. 2 will be described below with reference to the signal waveform diagram shown in FIGS. 3A to 3G.

As shown in FIGS. 3A to 3D, drive signals CP1, CP2, $\overline{CP1}$ and $\overline{CP2}$ each having a phase difference of 90° are generated from the drive signal generator DSG. As shown in FIG. 3E, the control signal CS1 increases after one of the drive signals CP1 and $\overline{CP1}$ has increased and falls immediately before the other drive signal increases. That is, this control signal CS1 is maintained at 0 V when the exciting current is supplied to the motor coil L1 or L2 to actually drive the stepping motor. Similarly, as shown in FIG. 3F, the control signal CS2 is also maintained at 0 V when the exciting current is supplied to the motor coil L3 or L4 to actually drive the stepping motor.

It is now assumed that the drive signal CP1 and control signal CS1 reach 0 V. In this case, the transistor TR13 is conductive and a voltage VN1 to be applied to the inverting input terminal of the comparator CMP2 is represented by the following equation.

$$VN1 = \frac{R28}{R27 + R28} \times VEE \quad (5)$$

Assuming R27=4.7 kΩ, R28=2 kΩ, and VEE=5 V, then the input voltage VN1 is almost equal to 1.49 V.

A low level or 0 V output voltage is generated from the comparator CMP2 by this input voltage VN1 of 1.49 V, and the transistors TR12 and TR11 are turned on by this low level output voltage. Since the drive signal CP1 is now at a low level and the transistor TR1 is conductive, a current IF2, which gradually increases, flows through the transistor TR11, choke coil LX, motor coil L1, diode D11, transistor TR1, and resistor R1. Thus, the stepping motor is step-driven in only one step. Thereafter, when a predetermined period of time has passed and the current IF2 becomes larger than VN1/R1, the output voltage of the comparator CMP2 reaches the high level VH as shown in FIG. 3G, so that the transistors TR12 and TR11 are rendered non-conductive. In this case, the current IF2, which gradually decreases, continuously flows through the diode D11, transistor TR1 and resistor R1 due to the current energy accumulated in the coils LX and L1. The output voltage of the comparator CMP2 changes from 0 V to VH level, so that a feedback current flows from the output terminal of this comparator CMP2 through the capacitor C2 and resistor R29 to the non-inverting input terminal. A voltage VB1 represented by the following equation is fed back to this non-inverting input terminal.

$$VB1 = (VH - VD)\left(1 - e^{-\frac{t}{C2 \cdot R29}}\right) \quad (6)$$

In the above equation, VD indicates a voltage applied to the non-inverting input terminal of the comparator CMP2 due to a voltage drop across the resistor R1.

When the input voltage VP1 to the non-inverting input terminal of the comparator CMP2 becomes lower than the input voltage VN1 to the inverting input terminal, the output voltage of the comparator CMP2 becomes 0 V as shown in FIG. 3G, so that the transistors TR12 and TR11 are turned on and the current IF2, which gradually increases, flows through the resistor R1. It should be noted that the time constant due to the capacitor C2 and resistor R29 is preset to a sufficiently large value so that the input voltage VP1 becomes lower than the input voltage VN1 after the voltage VD1 has reached a sufficiently low level. When this current IF2 becomes larger than VN1/R1, the output voltage of the comparator CMP2 again reaches the high level VH. Similar operations are repeatedly executed until the drive signal $\overline{CP1}$ reaches a low level and a pulse signal having a frequency to be determined by C2×R29 is generated from the comparator CMP2. FIG. 3H shows the voltage output generated from the comparator corresponding to the comparator CMP2 in the motor coil energizing circuit MECE2. As is apparent from FIGS. 3G and 3H, the motor is step-driven by one step each time the control signal CS1 or CS2 falls, and the motor is held in the present location until the control signal CS2 or CS1 falls.

Next, the case where the drive signal CP1 is at a low level and the control signal CS1 is at a high level will be discussed. In this case, the transistor TR13 is non-conductive and an input voltage VN2 to the inverting input terminal of the comparator CMP2 is represented by the following equation.

$$VN2 = \frac{R28}{R26 + R27 + R28} \times VEE \quad (7)$$

If R26=7.5 kΩ, then the input voltage VN2 is almost equal to 0.7 V. When this input voltage VN2 is higher than the input voltage VP2 to the non-inverting input terminal of the comparator CMP2, the output voltage of this comparator CMP2 is 0 V, causing the transistors TR12 and TR11 of the switching circuit TSC2 to be turned on, so that the current IF2 flows through the transistor TR11, choke coil LX, motor coil L1, diode D11, transistor TR1, and resistor R1. When this current IF2 is larger than VN2/R1, the output voltage of the comparator CMP2 reaches the high level VH. Thus, the transistors TR12 and TR11 are turned off and the current IF2 continuously flows through the resistor R1 due to the current energy accumulated in the coils LX and L1. In this case, a feedback current simultaneously flows through the capacitor C2 and resistor R29 and a voltage VB2 represented by the following equation is fed back to the non-inverting input terminal of the comparator CMP2.

$$VB2 = (VH - VD)\left(1 - e^{-\frac{t}{C2 \cdot R29}}\right) \qquad (8)$$

After a certain time interval, the voltage VD to the non-inverting input terminal of the comparator CMP2 is sufficiently low due to the voltage drop across the resistor R1; thereafter, the feedback voltage VB2 is also low and the input voltage VP2 becomes lower than the input voltage VN2. At this time, the output voltage of the comparator CMP2 reaches 0 V and the transistors TR12 and TR11 are turned on, causing the current IF2 to flow again through the resistor R1. In this way, a pulse signal having a frequency determined by C2×R29 is generated from the comparator CMP2. As shown in FIG. 3G, this pulse signal is stopped when the control signal CS1 reaches a low level and the drive signal CP1 reaches a high level. Furthermore, generation of this pulse signal is again started after the step-driving of the motor has been completed by the drive signal $\overline{CP1}$.

As described above, in the stepping motor driving circuit shown in FIG. 2, the exciting current flows through each motor coil at periods determined by C2×R29 during the holding of the stepping motor; therefore, this stepping motor can be stably driven step by step.

What is claimed is:

1. A stepping motor driving circuit comprising:
   a power supply terminal and a reference potential terminal;
   at least one coil current control circuit having a switching circuit connected between each one end of a pair of motor coils and said power supply terminal, first resistive means, one end thereof being connected to said reference potential terminal, and first and second switching means which are respectively connected in series with said pair of motor coils between said switching circuit and the other end of said first resistive means;
   energizing means for alternately turning on said first and second switching means;
   a reference voltage generating means;
   comparing means whose first and second input terminals are respectively connected to said reference voltage generating means and the other end of said first resistive means and which controls the conduction state of said switching circuit in accordance with the voltages applied to said first and second input terminals; and
   a series circuit of second resistive means and capacitive means connected between the output terminal and the second input terminal of said comparing means;
   said reference voltage generating means comprising third switching means, third resistive means connected in parallel with said third switching means, and fourth resistive means connected in series with said third switching means, and wherein said reference voltage generating means generates one of two different reference voltages in accordance with the conduction state of said third switching means.

2. A stepping motor driving circuit according to claim 1, wherein said third switching means comprises a transistor.

3. A stepping motor driving circuit according to claim 1, wherein said first and second switching means comprise respective transistors whose current paths are respectively connected between said first resistive means and said pair of motor coils.

4. A stepping motor driving circuit according to claim 3, wherein said coil current control circuit further includes first and second diodes having respective anodes connected with said pair of motor coils, and said first and second diodes having respective cathodes coupled to said power supply terminal such that a potential is applied to the diodes to bias them in their forward bias direction.

5. A stepping motor driving circuit according to claim 1, wherein said coil current control circuit further includes first and second diodes having respective anodes connected with said pair of motor coils, and said first and second diodes having respective cathodes coupled to said power supply terminal such that a potential is applied to the diodes to bias them in their forward bias direction.

* * * * *